United States Patent
Bassa

(10) Patent No.: US 8,190,367 B2
(45) Date of Patent: May 29, 2012

(54) SYSTEM AND METHOD FOR ASSESSING AND REDUCING AIR POLLUTION BY REGULATING AIRFLOW VENTILATION

(75) Inventor: Nir Bassa, Jerusalem (IL)

(73) Assignees: Bassa Nir (IL), part interest; G.R.G. Patents Ltd. (IL), part interest (*) Notice: Subject to any disclaimer, the term of this patent is extended or adjusted under 35 U.S.C. 154(b) by 488 days.

(21) Appl. No.: 12/280,288

(22) PCT Filed: Feb. 14, 2007

(86) PCT No.: PCT/IL2007/000205
§ 371 (c)(1),
(2), (4) Date: Aug. 21, 2008

(87) PCT Pub. No.: WO2007/096865
PCT Pub. Date: Aug. 30, 2007

(65) Prior Publication Data
US 2009/0265037 A1    Oct. 22, 2009

Related U.S. Application Data

(60) Provisional application No. 60/744,610, filed on Feb. 21, 2006.

(51) Int. Cl.
*G01W 1/00*    (2006.01)
(52) U.S. Cl. .......... 702/3; 73/31.01; 73/31.02; 73/31.03
(58) Field of Classification Search ..... 702/3; 73/31.01, 73/31.02, 31.03, 170.6
See application file for complete search history.

(56) References Cited

U.S. PATENT DOCUMENTS

| 5,831,876 A * | 11/1998 | Orr et al. ............... 703/6 |
| 6,098,893 A | 8/2000 | Berglund et al. |
| 6,114,964 A | 9/2000 | Fasano |

(Continued)

FOREIGN PATENT DOCUMENTS

EP    0527307    2/1993

(Continued)

OTHER PUBLICATIONS

A review and evaluation of intraurban air pollution exposure models. M. Jerrett, et al. Internet: http://www.nature.com/jes/journal/v15/n2/pdf/7500388a.pdf, Aug. 2004.

(Continued)

*Primary Examiner* — Janet Suglo
(74) *Attorney, Agent, or Firm* — Cantor Colburn LLP

(57) ABSTRACT

Disclosed are means for monitoring the levels of air pollution in urban areas for the purpose of optimizing the conditions of airflow ventilation of buildings according to air pollution levels in their area. The invention supplies data in real time regarding local air pollution levels or relative levels, i.e. current air pollution levels in relation to previous ones. The disclosed system and method makes use of the fluctuations in air pollution levels in order to achieve optimal reduction of air pollution levels inside buildings. The system defines optimal times for ventilation in order to achieve a significant and persisting improvement of indoor air quality, in a routine manner, by using measurements of nondeterministic, continuous and effective fluctuations in air pollution levels at the surroundings of each building, specifically in locations which don't include monitoring stations.

32 Claims, 11 Drawing Sheets

U.S. PATENT DOCUMENTS

| | | | |
|---|---|---|---|
| 6,369,716 B1 * | 4/2002 | Abbas et al. | 340/632 |
| 6,711,470 B1 * | 3/2004 | Hartenstein et al. | 700/276 |
| 6,941,806 B2 * | 9/2005 | Burns et al. | 73/170.02 |
| 2002/0144537 A1 * | 10/2002 | Sharp et al. | 73/31.01 |
| 2006/0150644 A1 * | 7/2006 | Wruck | 62/126 |

FOREIGN PATENT DOCUMENTS

| | | |
|---|---|---|
| JP | 11078485 | 3/1999 |
| JP | 2003025831 | 1/2003 |
| JP | 2004157898 | 6/2004 |
| JP | 2005221107 | 8/2005 |
| WO | WO 99/46921 | 9/1999 |
| WO | WO02/063294 | 8/2002 |

OTHER PUBLICATIONS

Sensor Based 1-22 Demand Controlled Ventilation, A.T De Almeide; W.J. Fisk. Internet: http://www.osti.gov/bridge/servlets/purl/539516-accxfr/webviewable/539516/pdf, Jul. 1997.

International Search Report; International Application No. PCT/IL2007/000205; International Filing Date: Feb. 14, 2007, Date of Mailing: Nov. 26, 2008; 1 page.

Written Opinion of the International Searching Authority; International Application No. PCT/IL2007/000205; International Filing Date: Feb. 14, 2007, Date of Mailing: Nov. 26, 2008; 5 page.

European Search Report: European Application No. EP07706147.1; Date: Aug. 28, 2011; 7 pages.

S.T. Leong et al, "Air Pollution and Traffic Measurements in Bankok Streets" ; Asian J. Energy Environ.; vol. 3; Issues 3-4; (2000); pp. 185-213.

* cited by examiner

Fig 8
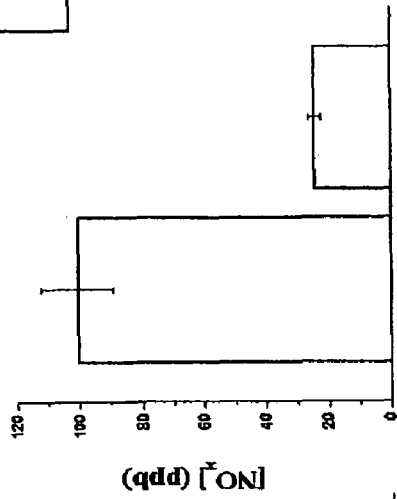
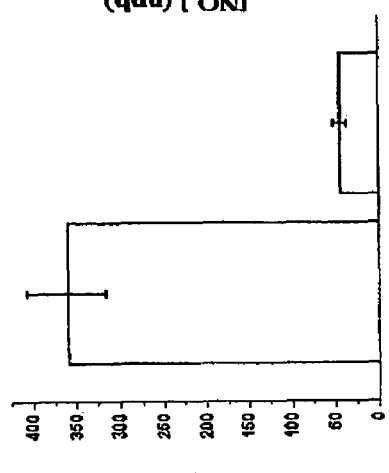
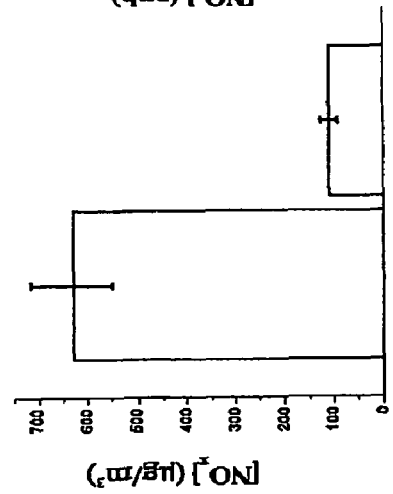
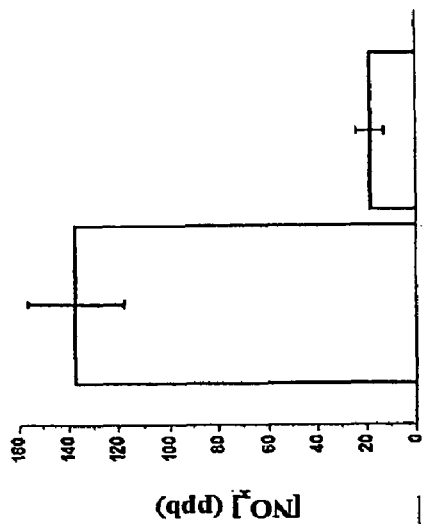
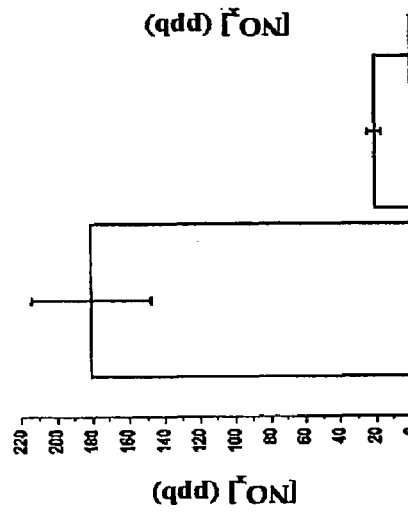
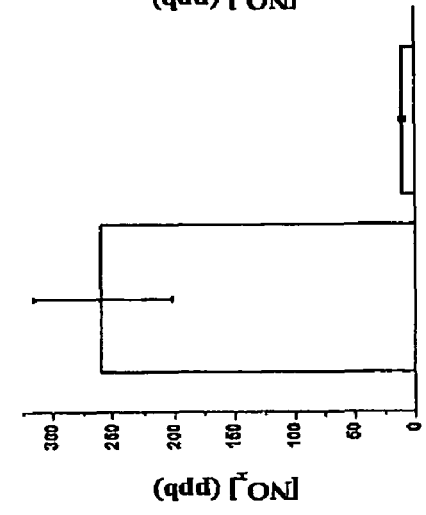

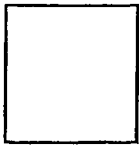
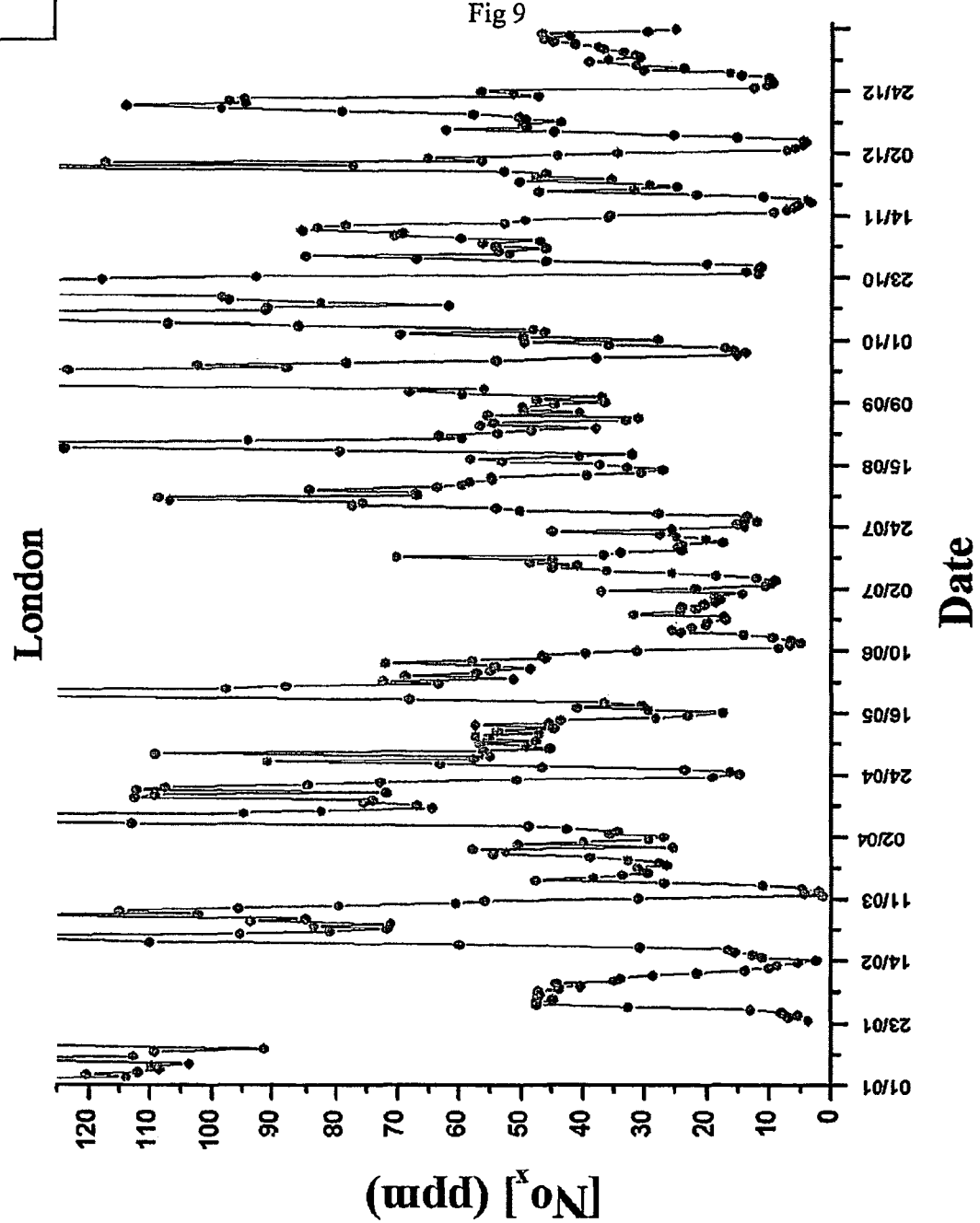
Fig 9

SYSTEM AND METHOD FOR ASSESSING AND REDUCING AIR POLLUTION BY REGULATING AIRFLOW VENTILATION

FIELD OF INVENTION

The present invention relates in general to the field of monitoring the air pollution in a given environment, more precisely it relates to systems and methods for estimating local air pollution tendencies and for optimizing in a routine manner the conditions of airflow ventilation of buildings according to air pollution measurements.

The problem of indoor air pollution is no less severe than the pollution outdoors because outdoor pollution diffuses into the space of buildings, and because inside buildings there are many sources of air pollution emitting pollution into the limited volume of the buildings themselves. The present invention is non specific in dealing with air pollutants, and it is suitable for dealing with ultra-fine particles and very small gaseous pollutants which are the most common, the most dangerous and the most cancerous pollutants.

SUMMARY

Disclosed is a method for estimating absolute or relative levels of air pollution and air pollution tendencies in different locations of an urban area using at least one air pollution monitoring station and at least one computing center. The method is comprised of continuously gathering air pollution data and identifying daily frequent air pollution fluctuations in a routine manner in real time from at least one location in the urban area and transmitting the data to at least one computing center. The method also includes the steps of performing a preliminary stage of identifying synchronizations regarding tendencies of air pollution levels between different locations of the urban area, and analyzing the data in the computing center and estimating levels of air pollution in at least one location of that same urban area which does not include a monitoring station, based on the preliminary stage.

The preliminary stage further includes the steps of gathering air pollution tendencies from a second location in the urban area and analyzing patterns, regularities and dependencies regarding differences in air pollution tendencies at the locations of the same urban area by the computing center. The method optionally sends the information to an automatic ventilation regulating unit in the enclosed environment, such as a building or a vehicle or to a person located in the urban area.

The method may also include gathering from at least one location in the urban area data concerning intervening factors. The intervening factors include parameters which influence the concentration, diffusion and dispersion of air pollution and transmitting the data of the intervening factors to the computing center. The air pollution tendencies in sections of the urban area which do not include a monitoring station are estimated in accordance with data from remote monitoring stations and the intervening factors. The intervening factors optionally include the distance between each monitoring station and each location, wind direction, wind speed, temperature, topography, barometric pressure, humidity levels, angles or vectors of these parameters in relation to each location, and the composition of air and sunlight intensity.

The method optionally also includes the step of calculating a factor for determining the relative influence of each monitoring station in estimating air pollution tendencies of each location which does not include a monitoring station when monitoring air pollution levels in at least two different locations of the same urban area. The factor for each possible pair of a monitoring station and a location is calculated according to the intervening factors.

The analyzed data is transmitted to recipients in the urban area. The analyzed data relates to real time relative air pollution levels in the surroundings of the recipient. The analyzed data includes commands concerning the ventilation of the enclosed environment with air from the outside. The commands are determined according to current estimations of relative levels of air pollution in the surroundings of the enclosed environment compared to a calculated threshold of relative air pollution level for each location of the enclosed environment. The calculations rely on predictions of air pollution levels according to prediction algorithms, such as learning algorithms.

The threshold is determined by the computing center according to relative levels of pollution in previous ventilation points in time. In calculating the threshold the method measures the time span between every two consecutive ventilations of the enclosed environment and takes into account the time span in calculating the threshold wherein the longer the time span the higher the threshold. The maximum time span between every two consecutive ventilation commands is predefined within each automatic ventilation regulating unit or by the computing center according to relevant parameters of each enclosed environment.

The method also measures air components in the enclosed environment and takes into account this data in the calculation of the threshold wherein a better composition of air components in the enclosed environment allows a lower threshold. The location of the enclosed environment is optionally identified in real time. The locating process is conducted using a global positioning system (GPS) or location identification of cellular device.

The ventilation commands are determined in accordance with characteristics of the enclosed environment. The characteristics of the enclosed environment optionally include the volume, population and levels of activity inside the enclosed environment.

The method optionally also includes the step of receiving feedback information from the enclosed environments and adjusting the calculations accordingly. The automatic ventilation regulating unit optionally includes a $CO_2$ sensor and the activation of air flow ventilation from the outside is activated when $CO_2$ levels exceed a predefined threshold.

Also disclosed is a system for monitoring and estimating the daily levels or relative levels of air pollution in urban areas for the purpose of optimizing the conditions of airflow ventilation of enclosed environments. The system comprises stationary or mobile air pollution monitoring stations placed in the urban area for continuously monitoring routine fluctuations in the air pollution levels at its location. The system also includes a second monitoring station operating for a preliminary identification of synchronizations regarding tendencies of air pollution levels between different locations of the same urban area and a centralized optimization and control computing center for gathering and analyzing data of air pollution received from the monitoring stations. This information is collected by the computing center through a first communication network and control commands are sent through a second communication network to recipients in the enclosed environments. The control commands include ventilation mode data.

Recipients may be located in sections of the urban area which do not include a monitoring station. The recipient may be an automatic ventilation regulation unit or a person located within the urban area. A positioning system, such as a GPS unit; a cellular communication unit, may be used for determining the location of the recipient. The system includes an algorithm for periodic measurements and assessments for predicting regular points in time in which air pollution levels are relatively low.

The automatic ventilation regulating unit controls the ventilation of the enclosed environment with air from the outside. The automatic ventilation regulating unit optionally also includes a timer for activating air flow ventilation from the outside after a predefined time. The automatic ventilation regulating unit optionally further includes a $CO_2$ sensor which allows the activation of air flow ventilation from the outside when $CO_2$ levels exceed a predefined threshold.

The second monitoring station gathers information concerning intervening factors. The intervening factors include parameters which influence the concentration, diffusion and dispersion of air pollution.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein

FIG. 8 is a diagram illustrating an average of daily maximal values compared to an average of daily minimal values of air pollution levels in six different urban areas;

FIG. 9 is a diagram illustrating the fluctuations in air pollution levels on seventeen different days in the same urban area (London);

Figure 1:
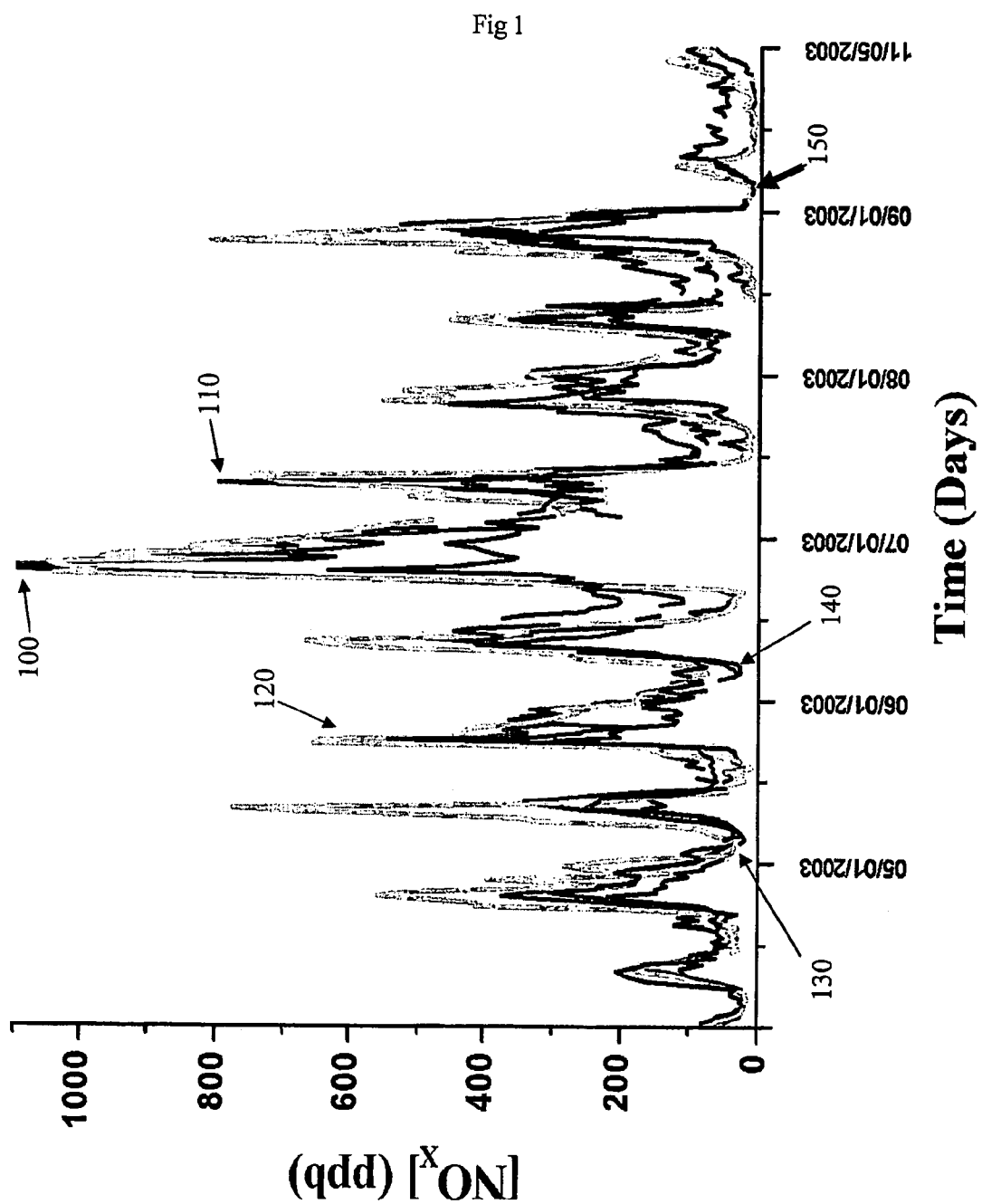
FIG. 1 is a diagram illustrating the measured fluctuations in air pollution in different locations of the same urban area (Tel-Aviv)

The drawings together with the description make apparent to those skilled in the art how the invention may be embodied in practice.

No attempt is made to show structural details of the invention in more detail than is necessary for a fundamental understanding of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

The present invention is a system and method for monitoring the levels of air pollution in urban areas for the purpose of transmitting air pollution data and for the purpose of optimizing the conditions of airflow ventilation of buildings according to the data. The term air flow ventilation herein refers to air flow ventilation from the outside into the building, while inside air is excluded; the term airflow circulation refers to indoor air ventilation. The disclosed system and method supplies data in real time regarding local air pollution levels or relative levels, i.e. current air pollution levels in relation to previous ones. The disclosed system and method makes use of the fluctuations in air pollution levels in order to achieve optimal reduction of air pollution levels inside buildings on a daily basis.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only. The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention can be implemented in the testing or practice with methods and materials equivalent or similar to those described herein.

The terms "bottom", "below", "top" and "above" as used herein do not necessarily indicate that a "bottom" component is below a "top" component, or that a component that is "below" is indeed "below" another component or that a component that is "above" is indeed "above" another component. As such, directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

One of the main purposes of this system and method is to define optimal times for ventilation in order to achieve a significant and persisting improvement of indoor air quality, in a routine manner, by using nondeterministic, continuous and effective fluctuations in air pollution levels at the surroundings of each building. Achieving this purpose does not require the system to hold absolute air pollution levels at the surroundings of each building, since the decisive factor in defining optimal times for ventilation is the tendency of the fluctuations in relative air pollution levels and not the absolute levels in and of themselves.

The above mentioned functions of the disclosed system and method require evaluation in real time of relative air pollution levels and their tendencies in the surroundings of each building. The suggested system and method can estimate actual or relative air pollution levels in different locations using only one or few monitoring stations in an entire urban area, this monitoring station may provide data regarding actual levels of pollution or merely relative levels of pollution. According to the present invention, in order to estimate the relative air pollution levels in different locations of the city, monitoring stations do not have to be located in those specific locations. Furthermore, the suggested system and method can define optimal times for ventilation in different locations of an entire urban area using only one processing center.

The suggested system and method is based on air pollution data analysis and characterization of urban air pollution. These developments present a unique approach, with important ecological advantages, enabling the system to deal effectively with a variety of pollutants and even with small gaseous pollutants and ultra-fine particles which could not be filtered by current state of the art technologies (designed to improve indoor air quality). Fine particles, ultra-fine particles and gaseous pollutants are the most common and most hazardous pollutants. Nevertheless the suggested solution can work with other products designed to improve indoor air quality, such as filters and purifiers, and it can also improve their efficiency and durability. Using this technology, clients could improve their health at the cost of only few dollars per month.

Embodiments of the present invention offer an efficient solution which significantly reduces the costs of evaluating in real time local air pollution tendencies or levels, the costs of communication channels and required transmissions and the costs of regulation units of airflow ventilation control. Thus, embodiments of the present invention can provide affordable airflow ventilation control devices for any building type, ranging from small rooms to large complexes of buildings. Herein the use of the term building refers to any kind of structure, apartment, office etc.

Empirical data gathered from selected cities throughout the world demonstrate and establish that dramatic fluctuations, an increase and decrease of air pollution levels—recur in each day. The results show that everyday in most cities there are times when air pollution levels drop to a value which is tenth of the highest levels of that day, in average. In some cities the average difference between the most polluted and the cleanest points in time is up to 30 times greater.

FIG. 8 is a diagram illustrating an average of daily maximal values compared to an average of daily minimal values of air pollution levels in six different urban areas. Regarding the cities London, Los Angeles, Tel Aviv and Haifa the sampling covered the entire year (otherwise, sampled by intervals of 22 days) skipping weekends and holidays because industrial activity and traffic are relatively low in these days. In New York City the sampling covered approximately a continuous month and a half. In Hong Kong the data covered an entire year. FIG. 8 demonstrates the recurrence of dramatic fluctuations each day in six different urban areas. The fact that all cities show a similar pattern, despite the differences in sampling, strengthens the claim that significant fluctuations of air pollution levels recur over the day.

Figure 10:
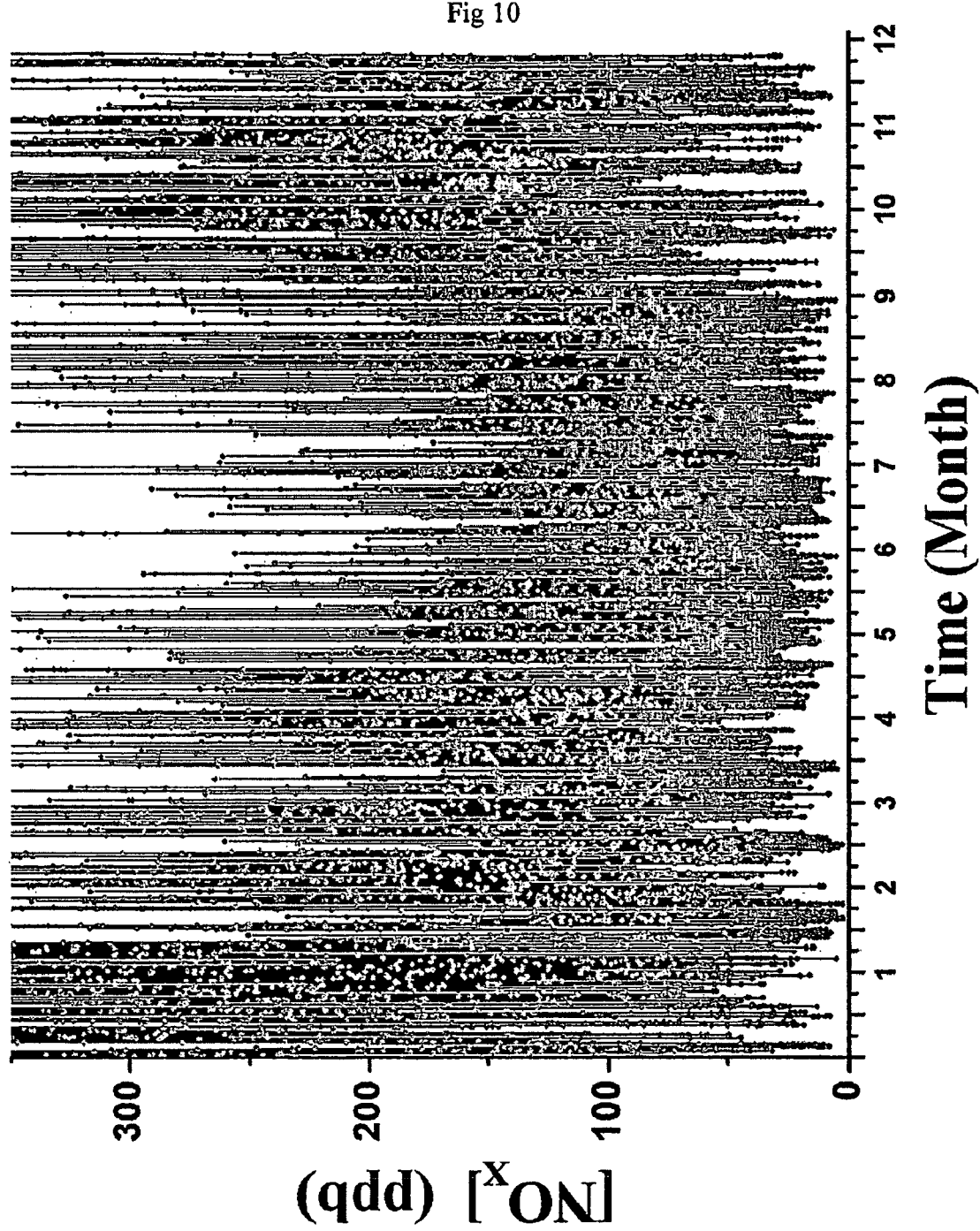
FIG. 10 is a diagram illustrating an entire year of air pollution fluctuations in the same urban area (Haifa)
Figure 11:
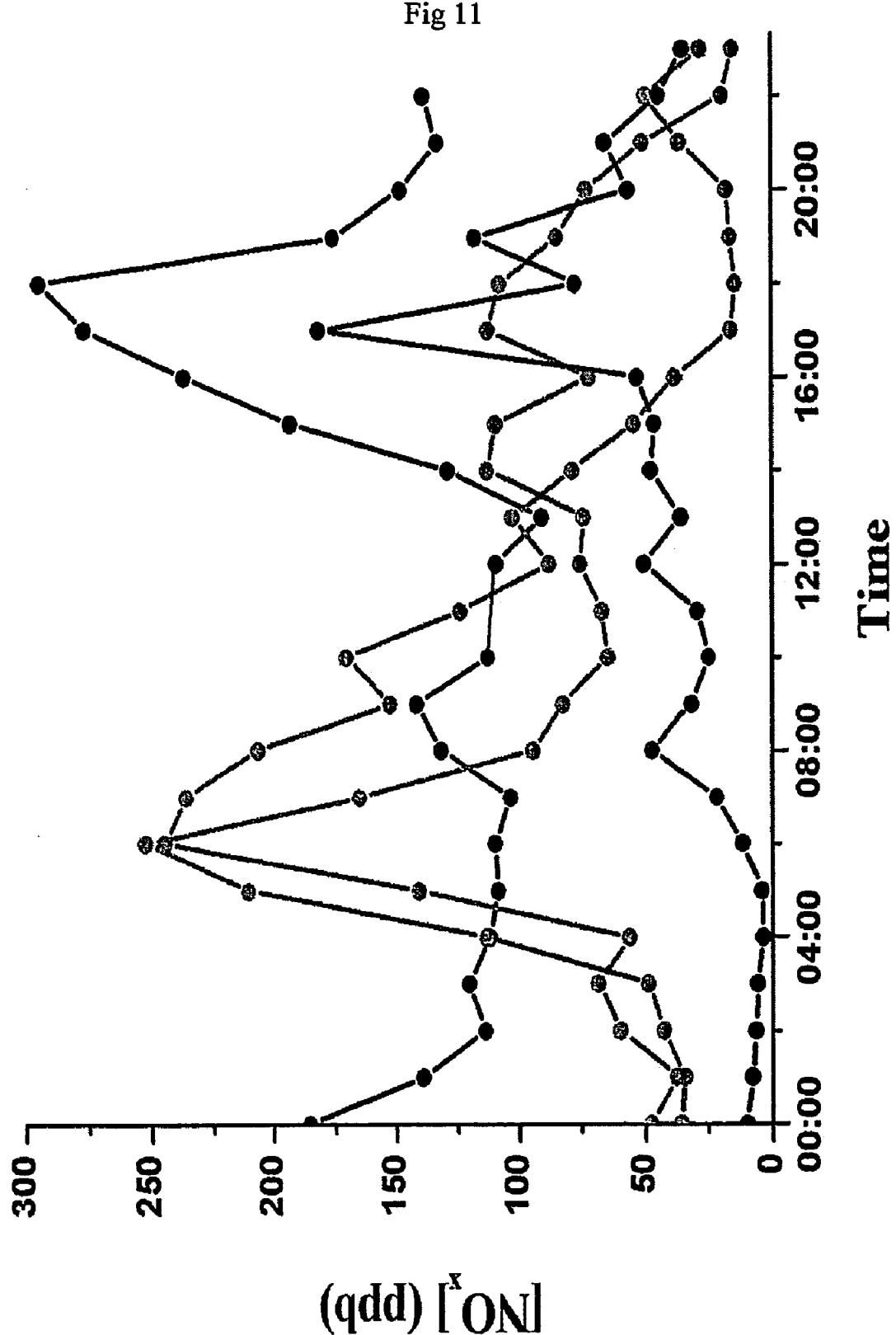
FIG. 11 is a diagram illustrating the fluctuations in air pollution levels on four different days in the same urban area superimposed (London).

FIG. 9 is a diagram illustrating the recurrence of significant fluctuations of air pollution levels as it was monitored in the city of London over a period of seventeen sampled days covering an entire year (sampled by intervals of 22 days). FIG. 10 is a diagram illustrating an entire year of measured fluctuations in the city of Haifa. As shown, air pollution fluctuations recur the entire year. Additionally, numerous fluctuations, especially in the winter, exceed maximum levels presented in FIG. 10. Air pollution levels are characterized by unpredictable, continuous, frequent and significant fluctuations that occur each day. FIG. 11 is a diagram illustrating such nondeterministic fluctuations. This diagram shows air pollution fluctuations as they were measured on four different days in the city of London. As illustrated by the data in the graph of FIG. 11, the levels of air pollution do not show any regularity.

Air pollution fluctuations do not take place according to predetermined cycles. Therefore there is no way to predict accurately the value of air pollution level in sequential points in time, in specific locations. Although there are some prototypes of systems, such as neural networks, designed to predict air pollution levels, these methods cannot deal efficiently with changes, they are not sensitive enough to detect local irregularities, they are not accurate and they are not adapted for analyzing air pollution in high resolution. For instance, these systems are not able to identify differences of air pollution tendencies and levels over minutes and dozens of minutes. Eventually, these systems could serve the suggested system and method in the future, but for now there is no way to predict precisely what will be the change of pollution levels in minutes, tens of minutes, or in any singular point in time months from now.

Using air pollution fluctuations in order to schedule the ventilation of buildings to the optimal times raises two main problems: First, there are feasibility and application problems. For example, air pollution fluctuations are not cyclic or predetermined. Therefore a system and a method is needed for deciding whether to ventilate in a certain point in time or to wait to the following point in time in order to achieve an optimal air quality in buildings.

The second problem is the high cost of such systems for each building. Only professional monitoring stations are sensitive enough to detect brief changes of air pollution levels effectively, in real-time and in high resolution. However the cost of professional monitoring stations is thousands of dollars per unit to say the least, and a constant, professional operation of the monitoring stations is needed for each building. Locating large, expensive and professional monitoring station at the surroundings of each building is not practical. Additionally, a connection must be established between monitoring stations and computers which must work according to programs capable of estimating the cleanest appropriate points in time for ventilation.

Air pollution fluctuations are not cyclic or predetermined and different parts of the urban city may show different levels of air pollution. However the disclosed system and method makes use of the fact that according to analysis performed on data accumulated by air pollution monitoring stations, urban areas tend to include vast homogeneous environments in terms of their air pollution tendencies. It is likely that in many cases an entire urban area will be a single environment in terms of air pollution tendencies. A resemblance in air pollution tendencies is a resemblance in the times in which air pollution levels increase or decrease, and in the times of minimum and maximum values. In other words, while different locations in a single urban area may have different levels of air pollution at any single point in time, the fluctuations in the monitored levels in the different locations tend to coincide.

FIG. 1 is a diagram illustrating the monitored levels of air pollution as they were monitored in four different sections in the city of Tel Aviv over a period of six days. As it is apparent from this diagram, although different levels of pollution were measured in the four monitoring stations the measured tendencies were primarily the same in all areas and the minimum levels, such as points 130, 140 and 150, and maximum levels, such as points 100, 110 and 120, coincided. While some sections may not be synchronized with one another, it is likely that two different sections of the same urban area may show detectible pattern or regularity regarding their differences in air pollution tendencies. Research conducted by the inventors has shown that these findings are characteristic of fluctuations in air pollution levels in urban areas.

Based on these findings and since the main purpose of this system and method is to identity these points of extremity, both the maximum and the minimum, to find the optimal times during the day for ventilating the buildings, the disclosed system and method proposes to make use of this phenomenon. Additionally, the disclosed system and method is designed to identify patterns and regularities regarding differences in air pollution tendencies between different parts of the urban area and make use of this phenomenon.

Figure 2:
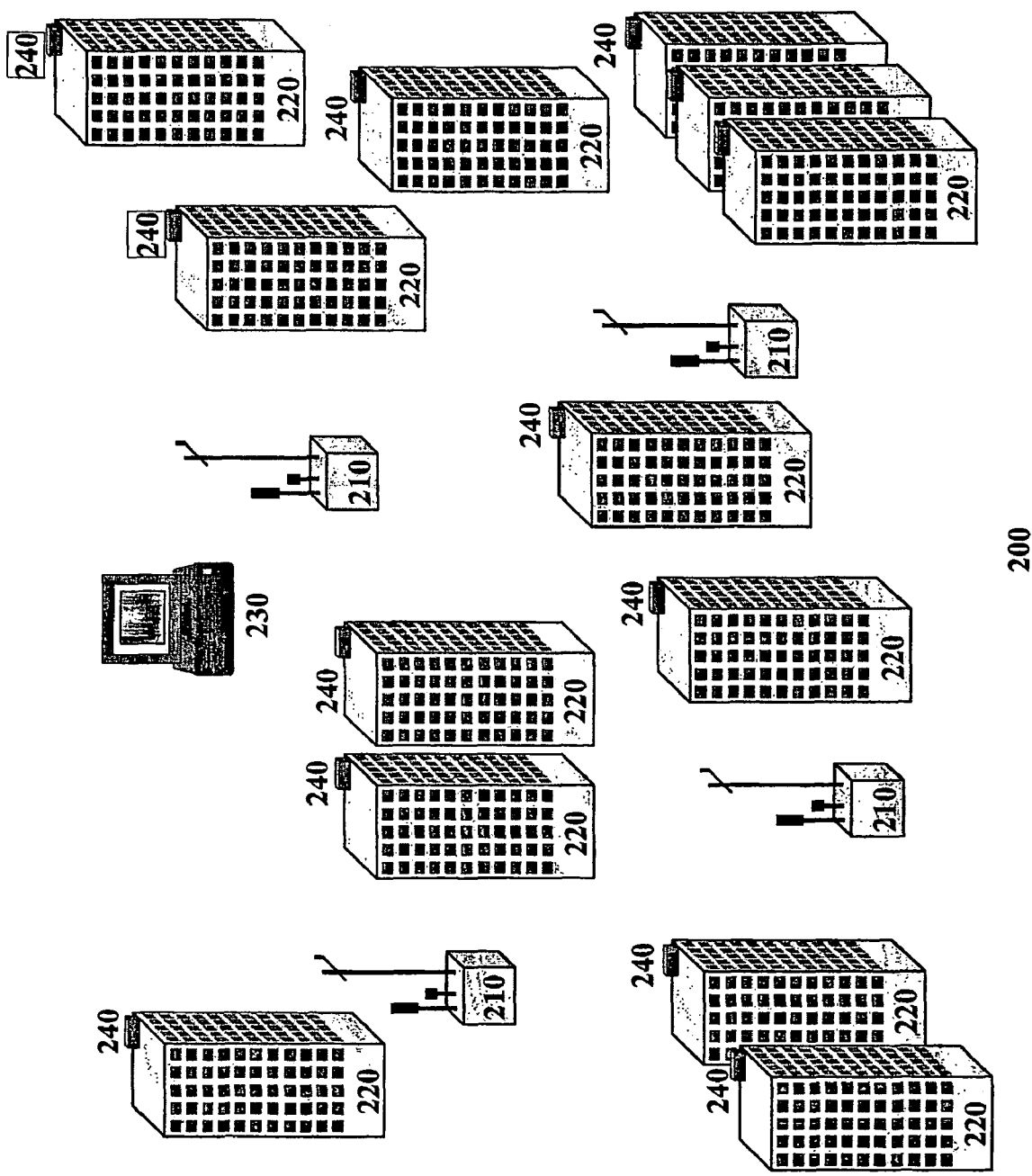
FIG. 2 is a schematic illustration of the environment in which embodiments of the present invention operate.

FIG. 2 is a schematic illustration of the principal system components located in an urban area according to embodiments of the present invention. Embodiments of the present invention are comprised of optimization and control computing center 230 and several air pollution monitoring stations 210, mobile or stationary, located in different sections of the same urban area 200. Also in urban area 200 are client buildings 220 whose airflow ventilation is regulated by simple regulating units 240. It is important to note that the number of computing centers 230 and the number of monitoring stations 210 is significantly smaller than the number of buildings whose airflow ventilation is controlled by the system. Even more so, a single optimization and control computing center 230 may serve several urban areas. Considering the fact that the air pollution monitoring stations 210 are usually the most expensive components in the system, this feature of the system dramatically reduces its implementation costs, since it requires only one or few monitoring stations 210 for each large urban area.

Figure 3:
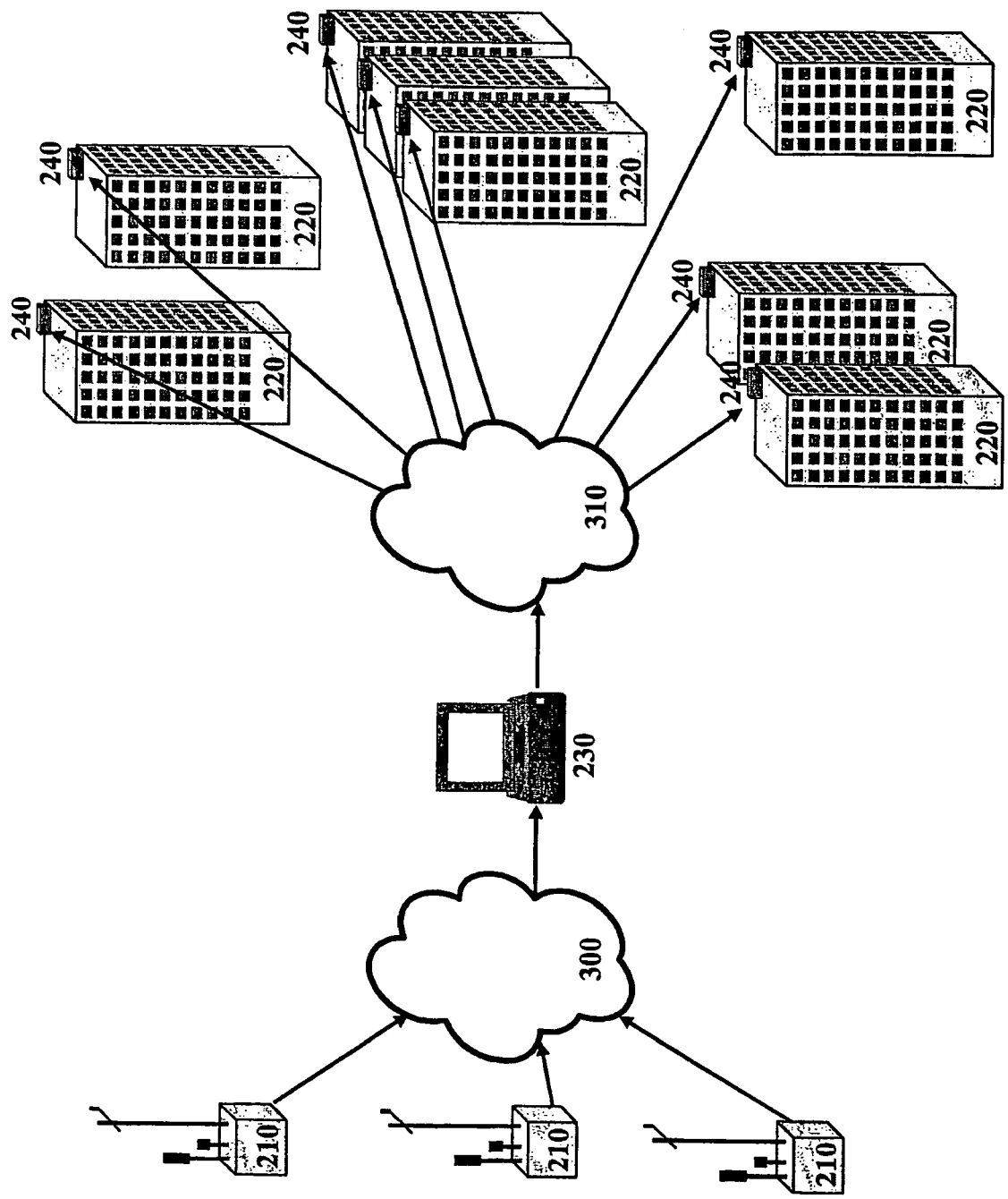
FIG. 3 is a schematic illustration of the flow of information between the components of embodiments of the present invention.

FIG. 3 is a schematic illustration of the flow of information between the components of the system according to embodiments of the present invention. Air pollution monitoring stations 210 monitor the air pollution levels at the locations in which they are positioned and transfer this data in real-time to optimization and control computing center 230 through network 300. The air pollution levels may be monitored continuously or in short time intervals. Other sources of data may serve optimization and control computing center 230. Network 300 may be a dedicated private network, a cellular data network, the internet or any other type of data communication network. The received data is stored and analyzed in optimization and control computing center 230. The communication between optimization and control computing center 230 and regulating units 240 is performed through network 310. Network 310 may be a dedicated private network, a cellular data network, the internet or any other type of data communication network.

The suggested system and method could estimate air pollution levels by using accepted air pollution markers such as NOx or other kinds of pollutants as well. Therefore the suggested system and method may work according to a normalized index.

In an environment defined by resemblance of air pollution tendencies it is possible to roughly evaluate air pollution tendencies in one location knowing the tendencies in another. The extent of the resemblance of air pollution tendencies between two different locations in the same urban area depends on several factors such as distance, wind direction, wind velocity, temperature etc. Knowing these factors and their values it is possible to optimize the evaluation of air pollution tendencies in different locations by monitoring air pollution tendencies in other locations within the same urban area.

Figure 4:
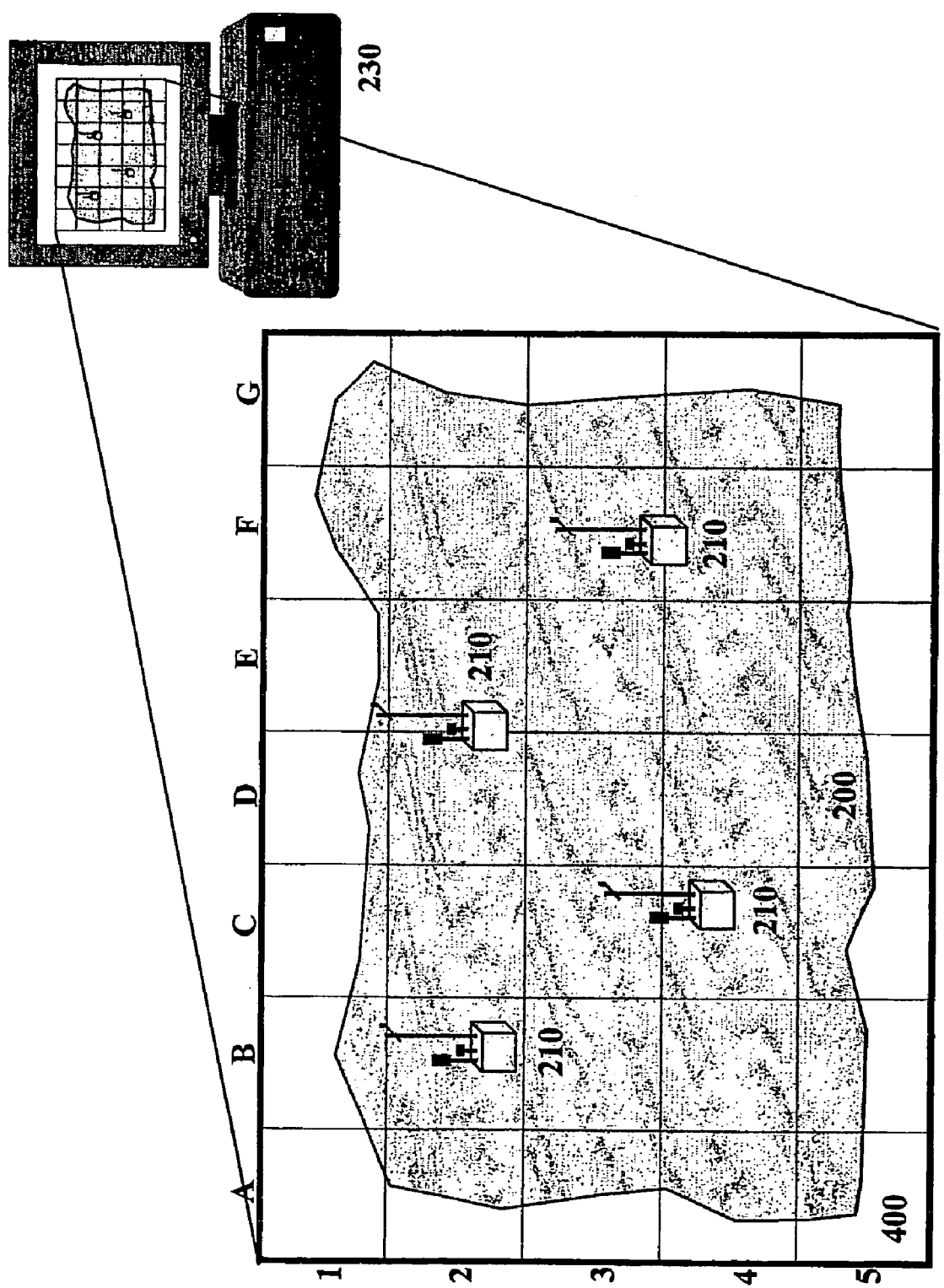
FIG. 4 is an illustration of the graphic representation of an urban area as a grid in the optimization and control computing center according to embodiments of the present invention.

Optimization and control computing center 230 holds a detailed map of urban area 200. The exact locations of the subscribed buildings are marked on the map. FIG. 4 is an illustration of the detailed map of urban area 200 viewed in the processing unit of optimization and control computing center 230. In map 400 urban area 200 is initially divided into primary sections, e.g. by dividing a city into a grid of squares, and marking the exact location of air pollution monitoring units 210. The size of the primary sections may be determined according to the homogeneity of air pollution tendencies in the city: fewer primary sections are needed in a homogenous city because its primary sections are larger. The system associates each building 220 with the primary section of urban area 200 to which it belongs. Based on the data received from monitoring units 210 in real time the system holds data about the air pollution levels in their primary sections, such as in primary sections B2, $C_4$, D-E2 and $F_{3-4}$. The air pollution in primary sections of urban area 200 which do not have an air pollution monitoring unit 210, such as primary sections C2, $D_3$ and F2, is estimated. The estimation of the air pollution levels in these primary sections is calculated and optimized according to data from all monitoring stations 210 in the urban area, whereas the relative weight of the data received from each station 210 is determined according to its distance from the given primary sections and taking into account other measured factors which are known to influence air pollution levels and diffusion, such as wind direction and speed, temperature, topography, barometric pressure, and humidity levels. Many factors could be measured by the monitoring stations, and others could be directly updated in the optimization and control computing center. This process of optimization is performed at the preliminary stage and may be performed periodically during the operation of the system, enabling to estimate actual levels of air pollutions in location which don't include monitoring stations.

A specific factor is calculated for each possible pair of a primary section and a monitoring station. The factor determines the relative influence of each station in relation to the other stations on assessing air pollution tendencies in the primary section. The values of factors received from the different monitoring stations are multiplied by the specific factors for each possible pair of a primary section and a monitoring station. The received multiplied values from all monitoring stations are then summed up, and divided by the sum of the factors in order to determine relative air pollution levels in different primary sections. Since a single or a small number of computing centers 230 may serve urban area 200, the reexamination of calculations, improvement and adjustments of algorithms, the updating of the map of the city and the locations of monitoring stations and the updating of additional parameters may all be performed centrally.

Additionally, periodic measurements, using mobile monitoring station, in a section which has no stationary monitoring station allows supplying data regarding accurate levels of pollution in that section. This enables the computing center to assess absolute levels of pollution in that section when monitoring stations are not placed at that section, and to compare the calculated estimation of pollution tendencies with the measured ones, and correct the calculation algorithm accordingly. According to one embodiment of the present invention the mobile monitoring stations may be positioned on a public transportation vehicle, such as a tram or a light-rail. Thus, the mobile monitoring station follows a regular course throughout the urban area and may transmit air pollution data at preprogrammed time intervals.

Since the fluctuations in the air pollution levels in all sections of urban area 200 are not cyclic or predictable in any way the system utilizes an optimization algorithm for determining optimal times for the ventilation of buildings. To ensure optimized results, and making sure that the buildings are ventilated at the points in time in which there is the minimal air pollution, the system compares the current estimated relative air pollution level at any point in time in the section in which the building resides and compares it with the relative air pollution levels of the last few airflow ventilations of that building. Thus, ventilation commands from the optimization and control computing center may be specific for each section. Determining optimal ventilation times for each building relies on three algorithms: the relevant pollution value of the buildings algorithm, the pollution level of a time unit algorithm and the compromising function. All three algorithms could be updated or changed.

The relevant pollution value of buildings is defined according to the relative levels of air pollution which were let into the buildings of a specific section during recent ventilations. The relevant pollution value of buildings depends on time units between two consecutive measurements. The weight of the time unit when outdoor ventilation actually took place in determining the relevant pollution value of buildings depends on the actuality of this time unit. As more ventilation commands are carried out, values of previous time units become less relevant in estimating the current pollution value of buildings. In any point in time in which there is an update of air pollution data the computing center 230 assesses for each section whether or not the present relative pollution value is smaller than or equal to the relevant pollution value of buildings. Ventilation from the outside is activated or continued when the measured values of pollution are smaller or equal to the "relevant pollution value of buildings".

To insure optimal usage of times in which air pollution levels are relatively low and to avoid long periods of time in which buildings are not ventilated, the system also operates a compromising function. This function expresses the required relation between the relevant pollution value of buildings and current level of pollution. According to this function, as time passes from the last ventilation a smaller relation between the relevant pollution value of buildings and the current levels of air pollution is needed in order to initiate ventilation from the outside. Thus, a relatively higher level of pollution is determined as sufficiently low to define current time as a time for ventilation. Once the ventilation in the buildings is activated, the relevant pollution value of those buildings is updated and the compromising function is recalculated.

Alternative functions may be used for determining the appropriate times for ventilating the buildings, and their parameters may be modified and updated. For instance, networks which make use of learning algorithms designed to predict air pollution levels, e.g. neural networks, may be used in order to improve the reaction time of the system and its ability to find optimal times for outdoor ventilation. Optimal ventilation times could also be determined according to periodic measurements and assessments that predict regular times in which air pollution levels are relatively low such as night hours.

Figure 5:
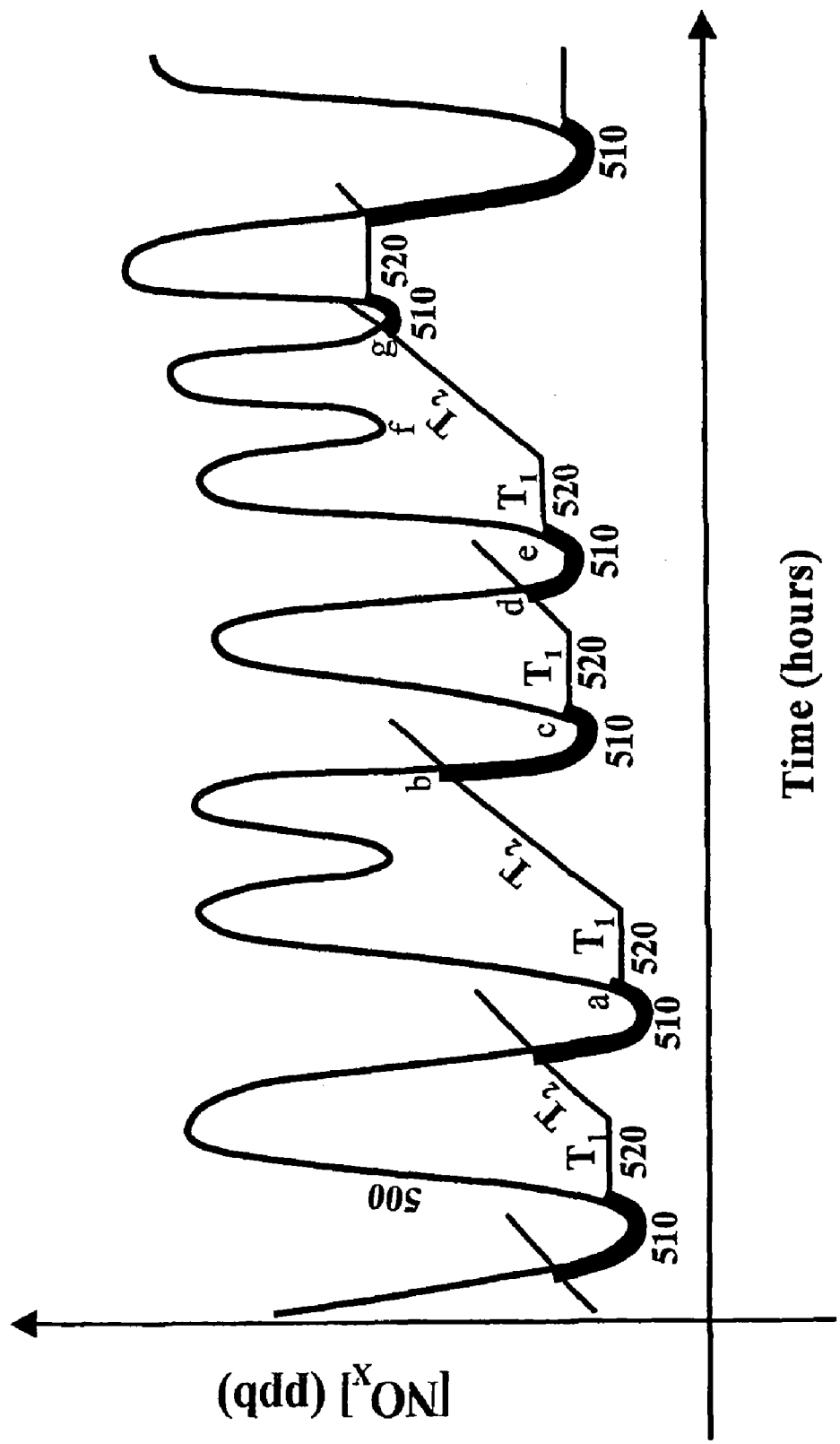
FIG. 5 is a diagram illustrating the operation of the compromising function according to embodiments of the present invention.

FIG. 5 is a diagram illustrating the operation of the compromising function. Line 500 marks the relative levels of air pollution in the section in which building 220 resides, sections 510 mark the period of time in which the airflow ventilation regulating unit 240 functioned and activated the airflow ventilation in building 220. Line 520 represents the calculated value according to the compromising function, it marks the maximal level of air pollution in which the airflow ventilation regulating unit 240 may be given a command to start the airflow ventilation. The level of line 520 is determined according to the level of the relevant pollution value of buildings in the last ventilations (e.g. points a, c and e). According to the compromising function shown in this illustration, line 520 remains constant for a predetermined time span $T_1$, and then increases gradually as time progresses $T_2$. Once the air pollution level decreases to the maximal level marked by line 520, such as at points b, e and g, the air ventilation regulating unit 240 is given a command to start operating once again. Thus, while the air pollution levels of points f and g are the same, the airflow ventilation regulating unit 240 is only given a command to operate in point g since point f is above line 520. The compromising function could be updated in relation to different conditions such as different weather conditions in different seasons.

Figure 6:
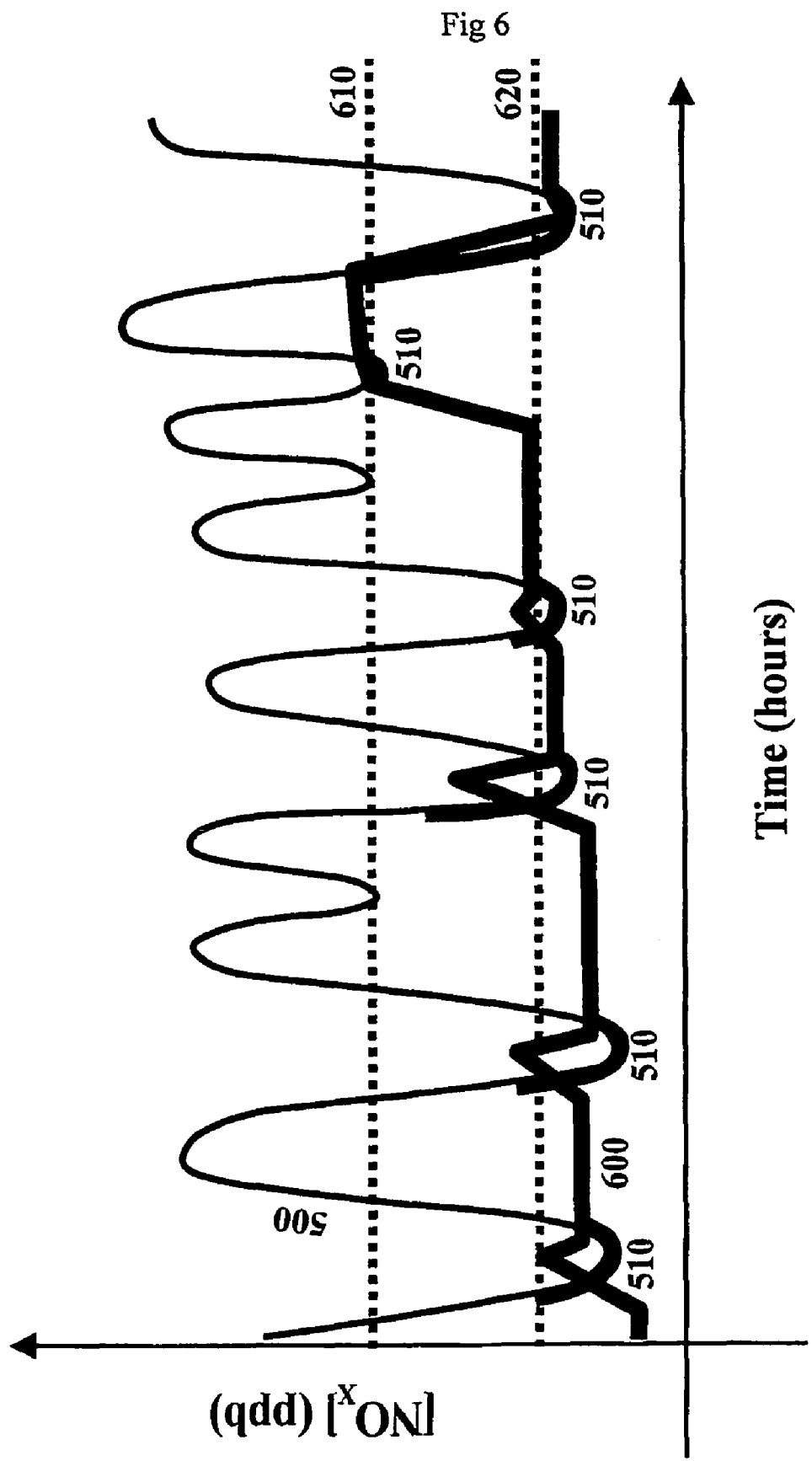
FIG. 6 is a diagram illustrating the levels of air pollution in the buildings in comparison to the air pollution outside the buildings as it is achieved by embodiments of the present invention.

FIG. 6 is a diagram illustrating the levels of air pollution in the buildings in comparison to the air pollution outside the buildings as it is achieved by the algorithm described above. Line 500 illustrates the levels of air pollution outside the building and line 600 illustrates the levels of air pollution inside the building. Line 610 marks the average value of the air pollution levels outside the building and line 620 marks the average value of the air pollution level inside the building. As it is apparent from the diagram, the average air pollution level outside the building 610 is significantly higher than the average air pollution level inside the building 620.

Ventilation regulating commands are sent to each client in the section. The low priced and simple ventilation regulating mechanism 240 is installed at each client building 220. Commands, such as start or stop, operate the ventilation process in the building. Additionally, the system can send intermediate commands which regulate the extent of ventilation, such as increase or decrease ventilation.

Professional monitoring stations are the most expensive items in the suggested system and method. Therefore it is desirable to reduce their number as much as possible. Similarity of tendencies in air pollution levels over large areas in the city makes it possible to reduce the number of monitoring stations. In a city where different sections are synchronized in terms of their air pollution tendencies one monitoring station will be sufficient to cover large areas and maybe even the entire urban area.

This system and method improve and reduce the data transference loads on communication pathways between the data gathering points of air pollution levels and other parameters and a large number of ventilation mechanisms. The usage of one processing center (the computing center), gathering air pollution data and other parameters from different locations and sources, enables each client to receive simple data, i.e. data already processed into clear data or instructions, from a single source. The use of one processing center relieves clients of the need to include a local processing unit. This system and method prevents the need to put a professional monitoring station in front of each building and in each section and to integrate numerous processors in every ventilation mechanism of every client. This system and method offers only one computing center which determines whether to send commands to a simple regulating unit 240 at each building. Moreover, the need to receive un-processed information, of different kinds and from different sources, by client's apparatus—is prevented. This system and method therefore prevents the need to integrate numerous processors in every ventilation mechanism of every client. Thus, an overload of continuous traffic of data in communication channels to the apparatus of the client is prevented. This reduces the cost and complexity of the proposed solution.

To further reduce costs and increase the efficiency of the system, different primary sections which show synchronized air pollution tendencies may be unified to form larger secondary sections. Hence, assessing air pollution tendencies and optimizing these assessments for the center of each secondary section is sufficient to establish air pollution tendencies for each building located in the secondary section. The grouping of primary sections into secondary sections is monitored and secondary sections could be rearranged. The efficiency of the division into secondary sections is examined by using mobile monitoring stations, as mentioned above, which serve as a quality control for the estimation of air pollution tendencies. As a result of this process the urban area is divided into sections according to synchronization of fluctuation occurrences in air pollution levels or relative levels and defining patterns of regularities regarding the differences of fluctuation occurrences between the distinct sections.

The computing center identifies patterns or regularities regarding differences in air pollution tendencies between different secondary sections. If such are identified, further efficiency can be achieved by using the same monitoring stations to assess air pollution tendencies in different secondary sections.

The proportions of the system are as follows: a single to several monitoring stations and a single computing center, whereas a single computer can serve different cities. These facilities may serve up to hundreds of secondary sections and domains per city, and thousands to several million clients. The suggested system and method can remotely regulate the activity of different kinds of ventilation systems and air conditioning systems in order to reduce air pollution indoors. It could be adapted and sold as a stand-alone product, as a mechanism that can be integrated in the ventilation and air conditioning systems of clients, or as a built-in mechanism, such as a chip, in production lines of air conditioning and ventilation systems. Therefore the suggested system and method can work with ventilation systems which are not connected to any kind of air conditioning systems.

In accordance with the commands sent from the computing center to the regulating units 240, the system regulates valves or vents which switch between inner circulation of air and air flow from the outside. In order to reduce air pollution levels in buildings which have inner circulation only, the ventilation system may be integrated with an alternated valve or vent regulating airflow from the outside.

Figure 7:
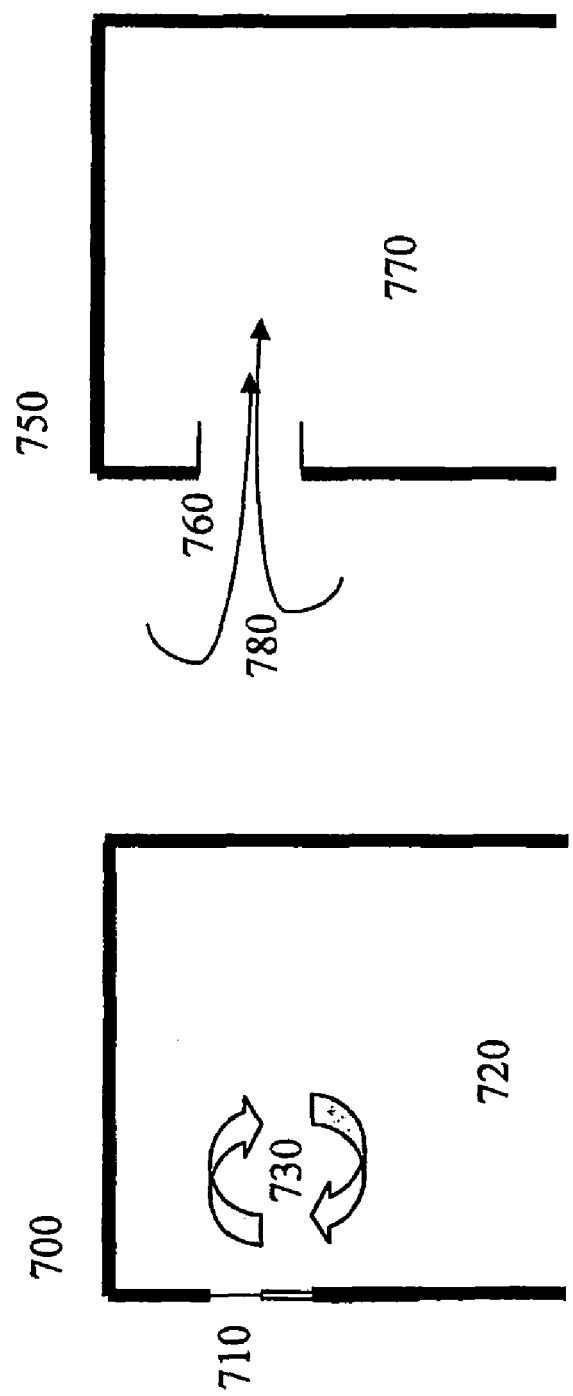
FIG. 7 is an illustration of the two states of the airflow in buildings and the operation of the airflow ventilation control units according to embodiments of the present invention.

FIG. 7 is an illustration of the two states of the airflow in buildings and the operation of the airflow ventilation regulating units. In state 700, the ventilation opening 710 is closed and the air inside the building 720 circulates 730. In state 750, the ventilation opening 760 is open, ventilators are active, and fresh air from the outside 780 flows in 770. Airflow ventilation regulating units 240 regulate the state of opening 710, 760. If current air pollution level is found to be equal or lower than the value calculated according to the compromising function, the system sends a command to regulation unit 240 to start, continue or increase the airflow ventilation. Provided that the current air pollution level is found to be higher than the value calculated according to the compromising function, the system sends a command to regulation unit 240 to stop or decrease the airflow ventilation An autonomous ventilation mechanism is designed to ignore air pollution levels outside, and to regulate the flow of fresh air into the building. This mechanism contains a timer which can operate outdoor ventilation even when no instructions are received from the control center. According to local parameters and conditions the autonomous ventilation mechanism can regulate the air flow from the outside. These local parameters may include a time limit on the amount of time between two each consecutive airflow ventilation activations. During the installation or configuration phase, the autonomous ventilation mechanism may be programmed to count the time from the last ventilation activation and automatically activate the ventilation after a predetermined time provided that a command from the central computing center was not received. After every decision of the optimization and control computing center to operate ventilation from the outside, the timer is charged with an additional delay time. The delay time is accumulated according to the duration of recent outdoor ventilation determined by the computing center, multiplied by a "delay coefficient" which characterizes the needs of the building. In a building which needs frequent ventilation, a smaller value of the delay coefficient may be determined, thus the delay time is smaller. The value of the delay coefficient is determined by the system's technicians during the installation of the system, and the system also defines the limitations of maximal delay time.

Clients could limit and decrease the delay time programmed in the timer, when they want more frequent outdoor ventilation than usual. Clients are not able to increase the delay time defined by the technicians, but are able to shut down ventilation systems.

According to another implementation of this embodiment the autonomous ventilation mechanism could be activated not by a timer only, but by another mechanism which is based on indoor $CO_2$ concentrations measured by a sensor integrated in the ventilation systems. A small $CO_2$ sensor is connected to the ventilation mechanism. The $CO_2$ sensor measures the levels of $CO_2$ inside the building and informs the autonomous ventilation mechanism when $CO_2$ levels exceed a predefined threshold, since relatively high levels of $CO_2$ indicate that ventilation of air from the outside is needed. The autonomous ventilation mechanism may then activate the airflow ventilation to reduce the levels of $CO_2$ inside the building.

According to one embodiment of the present invention a feedback loop is placed between the computing center 230 and regulating units 240. Computing center could receive information regarding airflow ventilation from the regulating unit 240 in every building 220. Computing center could also receive information regarding the activity and operation of air pollutant sources inside the enclosed environment such as the operation of cooking equipment. Doing so computing center could examine the efficiency of the operation in specific buildings. The computing center could also receive static information such as the size of the building, the primary activity hours in the building, the desirable airflow ventilation frequency of the building and its airflow ventilation rates, and dynamic information relating to the time passed since last ventilation and its length.

Optimization and control computing center 230 also holds information regarding all airflow ventilation regulating units 240 in every building 220. For each unit 240 computing center 230 holds its location in the urban area and the type of building in which it is installed. Airflow ventilation data regarding each regulating unit includes static information such as the size of the building, the primary activity hours in the building, the desirable airflow ventilation frequency of the building and its airflow ventilation rates, and dynamic information relating to the time passed since last ventilation and its length. According to this data, and according to air pollution fluctuations computing center 230 sends airflow ventilation commands, mainly orders to start or stop the airflow ventilation procedure in the building 220.

In illustration 6 the length of time span $T_1$ and the rate of gradient of $T_2$ may be determined according to the building static parameters, such as the size of the building, its airflow ventilation capacities, its estimated minimum and maximum population density and the periods of the day in which it is most densely populated. For instance, the compromising function for a large office building, which is expected to be densely populated in mid-day and in which the ventilation is poor, would be programmed to have a relatively short $T_1$ and a sharp gradient in $T_2$ during the day, to ensure frequent ventilation when the building is heavily occupied. On the other hand, the compromising function for a building with good ventilation rates and medium levels of population density can be programmed to have longer $T_1$ and a more moderate gradient in $T_2$.

According to another embodiment of the present invention the disclosed system may be accommodated to operate for vehicles of any kind, e.g. cars, busses, trains and ships anchored in seaports. For this purpose, a global positioning system (GPS) unit or a cellular unit is installed in the vehicle. Every predetermined time interval, the unit transmits the position of the vehicle to the computing center 230. Computing center 230 then determines whether to ventilate the interiors of the vehicle using air from the outside according to the relevant position of the vehicle in relation to the sections of each urban area as defined by computing center 230. In general, computing center 230 switches between ventilation from the outside and circulation according to the measured levels of pollution in the surroundings of the vehicle.

According to another embodiment of the present invention, the calculation results are sent directly to users of the system and not to automated airflow ventilation regulating units 240. The position of the user may be manually determined by the user. Alternatively, the position of the user may be identified according to the geographic location of a cellular mobile device carried by the user, such as a cellular phone, or a GPS unit, according to methods known in prior art. The position of the user is transferred to the computing center 230. Computing center 230 transmits messages to the users regarding the tendencies in air pollution levels at their current location and the optimal points in time for ventilation. These messages are optionally sent using any type of electronic messaging system in real time such as short messaging service (SMS) messages, instant messages, email messages, multimedia messaging service (MMS) messages and the like. Users of the system may also receive air pollution data regarding the levels of pollution in different locations and the optimal times for ventilation, in real time, via a dedicated website or query the system using any type of electronic messaging system. Thus users may decide when to ventilate their homes, offices, or wherever they are at any point in time.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A method for minimizing levels of air pollution in a non-monitored remote enclosed structure in an urban area, said method comprising the steps of:
   a. using no less than two independent air pollution monitoring stations and at least one computing center, continuously gathering outdoor air pollution data and detecting variable frequent fluctuations of outdoor air pollution levels which recur within the day;

b. transmitting said data gathered by the monitoring stations in real time to the computing center;

c. routinely and in real time, analyzing said gathered data in said computing center to identify relative levels of air pollution from at least two specific locations in said urban area;

d. based on said identified relative levels of air pollution, identifying synchronizations and dependencies of relative air pollution levels between at least two different locations of the urban area;

e. determining a relative influence factor for each monitoring station regarding its relative influence in calculating air pollution relative levels for different non-monitored locations of the urban area;

f. based on said synchronizations or dependencies of relative levels and on said determined factor, identifying relative minimal levels of outdoor air pollution, by calculating ratios between air pollution levels measured in different points in time for at least one remote structure which does not include an outdoor monitoring station; and g. ventilating the remote enclosed structure that its outdoor surroundings is not being independently monitored with outside air, during periods of minimal levels of air pollution thereby reducing air pollution concentration inside the structure.

2. The method of claim 1, wherein the step of identifying relative minimal levels of outdoor air pollution is preceded by the steps of:

a. using said gathered data; analyzing patterns, regularities and dependencies regarding differences in air pollution tendencies at said locations by said computing center;

b. identifying optimal periods for ventilation in different locations of the urban area based on the patterns, regularities and dependencies regarding the differences in air pollution tendencies at said locations.

3. The method of claim 1, wherein the step of gathering further comprising the steps of: continuously gathering data concerning intervening factors from a monitoring station in at least one location in said urban area.

4. The method of claim 3 wherein said intervening factors are: the distance between each monitoring station and each location, wind direction, wind speed, temperature, topography, barometric pressure, humidity levels, angles or vectors of these parameters in relation to each location, composition of air and sunlight intensity or any combination thereof.

5. The method of claim 3 further comprising the step of calculating a factor for determining the relative influence of each monitoring station in estimating air pollution tendencies of each non-monitored remote enclosed structure.

6. The method of claim 5, whereby the factor is calculated for each possible pair of a monitoring station and a location according to: the distance between each monitoring station and each location, wind direction, wind speed, temperature, topography, barometric pressure, humidity levels, angles or vectors of these parameters in relation to each location or each line between every possible pair of monitoring station and a location, composition of air, sunlight intensity or any combination thereof.

7. The method of claim 3, wherein said intervening factors include parameters which influence the concentration, diffusion and dispersion of air pollution.

8. The method of claim 3, further comprises the step of transmitting said data of said intervening factors to said computing center; and estimating the air pollution fluctuation tendencies in sections of said urban area that do not include a monitoring station in accordance with data from at least one remote monitoring station and said intervening factors.

9. The method of claim 1, wherein said step of ventilating comprises the step of providing ventilating commands that are determined according to current estimations of relative levels of air pollution for the surroundings of each non-monitored remote enclosed structure compared to a calculated threshold for the specific non-monitored remote enclosed structure.

10. The method of claim 9 wherein said threshold is determined by said computing center according to relative levels of pollution in previous ventilation points in time.

11. The method of claim 10, whereby the step of ventilating is preceded by the steps of:

measuring time span since the last ventilation of said enclosed structure to the present;

taking into account said time lapse in calculating said threshold wherein the longer the time lapse the higher the threshold.

12. The method of claim 9 wherein the maximum time span between every two consecutive ventilation commands is predefined.

13. The method of claim 9, wherein the recipient of the ventilating command is an automatic ventilation regulating unit in said non-monitored remote enclosed structure, a person located in said urban area, or both.

14. The method of claim 13 further including the step of, using a CO2 sensor, allowing the activation of air flow ventilation from the outside when CO2 levels exceed a predefined CO2 threshold.

15. The method of claim 9, wherein said ventilation commands are determined in accordance with characteristics of said non-monitored remote enclosed structure.

16. The method of claim 15 wherein said characteristics of said non-monitored remote enclosed structure are volume, population, levels of activity inside said enclosed environment or a combination thereof.

17. The method of claim 9, further comprising the step of receiving feedback information from said non-monitored remote enclosed structure and adjusting said threshold calculations accordingly.

18. The method of claim 1 wherein said non-monitored remote enclosed structure is a building, a vehicle or both.

19. A system for minimizing the levels of air pollution in a non-monitored enclosed structure by optimizing the conditions of airflow ventilation, said system comprises:

a. at least one independent first air pollution monitoring station placed in a urban area capable of continuously and in real time, monitoring and transmitting data relating to fluctuations in the air pollution levels;

b. a second independent monitoring station capable of identifying and transmitting data relating to fluctuations in the air pollution levels;

c. a centralized optimization and control computing center capable of:

i. gathering and analyzing data of air pollution received from said monitoring stations through a first communication network, identifying tendencies, synchronizations of tendencies and dependency of tendencies of air pollution levels between different locations of the same urban area;

ii. identifying in real time periods of relative minimal pollution levels at the monitored locations; and iii. calculating relative influence factor for each monitoring station regarding its relative influence in calculating air pollution relative levels for each non-monitored location of the urban area; and iv. using said identified spatial synchronizations of pollution tendencies or using said relative influence factor and said identified spatial dependencies between different locations, in order to identify periods of relative minimal pollution levels for remote structures which does not include an outdoor air pollution monitoring station; and V. sending ventilation control commands through a second communication network and based on the relative influence factor to a recipient in said non-monitored remote enclosed structure.

20. The system of claim 19 wherein said recipient is an automatic ventilation regulation unit capable of receiving said control command, a person located within said urban area, or both.

21. The system of claim 20 wherein said automatic ventilation regulating unit controls the ventilation of said non-monitored enclosed structure with air from the outside.

22. The system of claim 20 wherein said automatic ventilation regulating unit further includes a timer for activating air flow ventilation from the outside after a predefined time.

23. The system of claim 20 wherein said automatic ventilation regulating unit further includes a CO2 sensor capable of effecting ventilation of air flow from the outside when CO2 levels exceed a predefined threshold.

24. The system of claim 19, further including a positioning system for determining the location of said recipient.

25. The system of claim 24 wherein said positioning system is at least one of the following: a GPS unit; or a cellular communication unit.

26. The system of claim 19 wherein said non-monitored enclosed structure is a building, or a vehicle.

27. The system of claim 19 wherein said second monitoring station is mobile.

28. The system of claim 19 wherein at least one monitoring station is used for gathering and transmitting information concerning intervening factors.

29. The system of claim 28, wherein said factor is calculated for each possible pair of a monitoring station and a location based on the distance between each monitoring station and each location, wind direction, wind speed, temperature, topography, barometric pressure, humidity levels, angles or vectors of these parameters in relation to each location or each line between every possible pair of monitoring station and a location, composition of air, sunlight intensity or any combination thereof.

30. The system of claim 28, wherein said intervening factors comprise parameters which influence the concentration, diffusion and dispersion of air pollution.

31. The system of claim 19, wherein the centralized optimization and control computing center further including a processing unit with an algorithm for periodic measurements and assessments for predicting regular points in time in which air pollution levels are relatively low.

32. The system of claim 19, wherein the command sent to the recipient is based on a calculated factor determining the relative weight of each monitoring station.

* * * * *